June 30, 1959 P. J. ALLEN 2,892,982

TRIMODE HYBRID JUNCTION

Filed Dec. 19, 1956 3 Sheets-Sheet 1

INVENTOR
PHILIP J. ALLEN

BY W. R. Maltby
Richard C. Reed
ATTORNEYS

June 30, 1959 P. J. ALLEN 2,892,982

TRIMODE HYBRID JUNCTION

Filed Dec. 19, 1956 3 Sheets-Sheet 2

FIG. 3

| POWER | COAXIAL AND CIRCULAR ARMS MATCHED | RECTANGULAR AND COAXIAL ARMS MATCHED | RECTANGULAR AND CIRCULAR ARMS MATCHED |
|---|---|---|---|
| REFLECTED | $\frac{1}{16}$ (−12 db) | 0 | 0 |
| COUPLED TO EACH ADJACENT RECTANGULAR ARM | $\frac{1}{16}$ (−12 db) | $\frac{1}{16}$ (−12 db) | $\frac{1}{4}$ (−6 db) |
| COUPLED TO OPPOSITE RECTANGULAR ARM | $\frac{1}{16}$ (−12 db) | $\frac{1}{4}$ (−6 db) | 0 |
| COUPLED TO CIRCULAR ARM | $\frac{1}{2}$ (−3 db) | $\frac{3}{8}$ (−4.5 db) | $\frac{1}{2}$ (−3 db) |
| COUPLED TO COAXIAL ARM | $\frac{1}{4}$ (−6 db) | $\frac{1}{4}$ (−6 db) | 0 |

FIG. 4

| POWER | CIRCULAR AND COAXIAL ARMS MATCHED | RECTANGULAR AND COAXIAL ARMS MATCHED | RECTANGULAR AND CIRCULAR ARMS MATCHED |
|---|---|---|---|
| REFLECTED | 0 | $\frac{1}{4}$ (−6 db) | 0 |
| COUPLED TO ALIGNED RECTANGULAR ARMS | $\frac{1}{2}$ (−3 db) | $\frac{3}{8}$ (−4.5 db) | $\frac{1}{2}$ (−3 db) |
| COUPLED TO COAXIAL ARM | 0 | 0 | 0 |
| COUPLED TO ORTHOGONAL RECTANGULAR ARMS | 0 | 0 | 0 |

FIG. 5

| POWER | CIRCULAR AND COAXIAL ARMS MATCHED | RECTANGULAR AND COAXIAL ARMS MATCHED | RECTANGULAR AND CIRCULAR ARMS MATCHED |
|---|---|---|---|
| REFLECTED | 0 | 0 | 1 (0 db) |
| COUPLED TO EACH RECTANGULAR ARM | $\frac{1}{4}$ (−6 db) | $\frac{1}{4}$ (−6 db) | 0 |
| COUPLED TO CIRCULAR ARM | 0 | 0 | 0 |

INVENTOR
PHILIP J. ALLEN

BY W. R. Matthews
Richard C. Reed
ATTORNEYS

FIG. 6

| INPUTS (ALL OTHERS ARE ZERO) | OUTPUTS | | | | | | | | | | | | | |
|---|---|---|---|---|---|---|---|---|---|---|---|---|---|---|
| | PORT 1 | | PORT 2 | | PORT 3 | | PORT 4 | | PORT 5 | | PORT 6 | | PORT 7 | |
| | AMP. | PHASE | AMP. | PHASE | AMP. | PHASE | AMP. | PHASE | AMP. | PHASE | AMP. | PHASE | AMP. | PHASE |
| $A_1 = 1$ | 0.25 | $S_3$ | 0.25 | $-S_3$ | 0.25 | $S_3$ | 0.25 | $-S_3$ | 0.707 | $S_5$ | 0 | -- | 0.50 | $S_1$ |
| $A_1 = A_2 = 1$ | 0 | -- | 0 | -- | 0 | -- | 0 | -- | 0.707 | $S_5$ | 0.707 | $S_5$ | 1.00 | $S_1$ |
| $A_1 = A_3 = 1$ | 0.50 | $S_3$ | 0.50 | $-S_3$ | 0.50 | $S_3$ | 0.50 | $-S_3$ | 0 | -- | 0 | -- | 1.00 | $S_1$ |
| $A_1 = A_2 = A_3 = A_4 = 1$ | 0 | -- | 0 | -- | 0 | -- | 0 | -- | 0 | -- | 0 | -- | 2.00 | $S_1$ |
| $A_1 = -A_2 = 1$ | 0.50 | $S_3$ | 0.50 | $-S_3$ | 0.50 | $S_3$ | 0.50 | $-S_3$ | 0.707 | $S_5$ | 0.707 | $-S_5$ | 0 | -- |
| $A_1 = -A_3 = 1$ | 0 | -- | 0 | -- | 0 | -- | 0 | -- | 1.414 | $S_5$ | 0 | -- | 0 | -- |

FIG. 7

| INPUTS (ALL OTHERS ARE ZERO) | OUTPUTS | | | | | | | | | | | | | |
|---|---|---|---|---|---|---|---|---|---|---|---|---|---|---|
| | PORT 1 | | PORT 2 | | PORT 3 | | PORT 4 | | PORT 5 | | PORT 6 | | PORT 7 | |
| | AMP. | PHASE | AMP. | PHASE | AMP. | PHASE | AMP. | PHASE | AMP. | PHASE | AMP. | PHASE | AMP. | PHASE |
| $A_1 = 1$ | 0 | -- | 0.25 | $-S_3$ | 0.50 | $S_3$ | 0.25 | $-S_3$ | 0.354 | $S_2$ | 0 | -- | 0.50 | $S_1$ |
| $A_1 = A_2 = 1$ | 0.25 | $-S_3$ | 0.25 | $-S_3$ | 0.25 | $S_3$ | 0.25 | $S_3$ | 0.354 | $S_2$ | 0.354 | $S_2$ | 1.00 | $S_1$ |
| $A_1 = A_3 = 1$ | 0.50 | $S_3$ | 0.50 | $-S_3$ | 0.50 | $S_3$ | 0.50 | $-S_3$ | 0 | -- | 0 | -- | 1.00 | $S_1$ |
| $A_1 = A_2 = A_3 = A_4 = 1$ | 0 | -- | 0 | -- | 0 | -- | 0 | -- | 0 | -- | 0 | -- | 2.00 | $S_1$ |
| $A_1 = -A_2 = 1$ | 0.25 | $S_3$ | 0.25 | $-S_3$ | 0.75 | $S_3$ | 0.75 | $-S_3$ | 0.354 | $S_2$ | 0.354 | $-S_2$ | 0 | -- |
| $A_1 = -A_3 = 1$ | 0.50 | $-S_3$ | 0 | -- | 0.50 | $S_3$ | 0 | -- | 0.707 | $S_2$ | 0 | -- | 0 | -- |

FIG. 8

| INPUTS (ALL OTHERS ARE ZERO) | OUTPUTS | | | | | | | | | | | | | |
|---|---|---|---|---|---|---|---|---|---|---|---|---|---|---|
| | PORT 1 | | PORT 2 | | PORT 3 | | PORT 4 | | PORT 5 | | PORT 6 | | PORT 7 | |
| | AMP. | PHASE | AMP. | PHASE | AMP. | PHASE | AMP. | PHASE | AMP. | PHASE | AMP. | PHASE | AMP. | PHASE |
| $A_1 = 1$ | 0 | -- | 0.50 | $-S_3$ | 0 | -- | 0.50 | $-S_3$ | 0.707 | $S_5$ | 0 | -- | 0 | -- |
| $A_1 = A_2 = 1$ | 0.50 | $-S_3$ | 0.50 | $-S_3$ | 0.50 | $-S_3$ | 0.50 | $-S_3$ | 0.707 | $S_5$ | 0.707 | $S_5$ | 0 | -- |
| $A_1 = A_3 = 1$ | 0 | -- | 1.00 | $-S_3$ | 0 | -- | 1.00 | $-S_3$ | 0 | -- | 0 | -- | 0 | -- |
| $A_1 = A_2 = A_3 = A_4 = 1$ | 1.00 | $-S_3$ | 1.00 | $-S_3$ | 1.00 | $-S_3$ | 1.00 | $-S_3$ | 0 | -- | 0 | -- | 0 | -- |
| $A_1 = A_2 = 1$ | 0.50 | $S_3$ | 0.50 | $-S_3$ | 0.50 | $S_3$ | 0.50 | $-S_3$ | 0.707 | $S_5$ | 0.707 | $-S_5$ | 0 | -- |
| $A_1 = -A_3 = 1$ | 0 | -- | 0 | -- | 0 | -- | 0 | -- | 1.414 | $S_5$ | 0 | -- | 0 | -- |

INVENTOR
PHILIP J. ALLEN

BY

ATTORNEYS

United States Patent Office 2,892,982

Patented June 30, 1959

2,892,982

TRIMODE HYBRID JUNCTION

Philip J. Allen, North Forestville, Md., assignor to the United States of America as represented by the Secretary of the Navy Application December 19, 1956, Serial No. 629,426

10 Claims. (Cl. 333—11)

(Granted under Title 35, U.S. Code (1952), sec. 266)

The invention described herein may be manufactured and used by or for the Government of the United States of America for governmental purposes without the payment of any royalties thereon or therefor.

This invention relates in general to hybrid junctions for intermode coupling purposes in microwave propagation applications and in particular to hybrid junctions for coupling between 3 distinct modes of propagated wave energy.

A wide variety of hybrid junctions are available for coupling from one mode of propagation to another mode of propagation. Many of these prior art hybrid junctions provide lossless coupling between the two modes but few, if any, permit advantageous coupling between more than two modes of propagation. It may be said that the great majority of the prior art hybrid junctions are designed for specific applications and are not readily adaptable to perform satisfactorily in applications which differ extensively therefrom. It will be appreciated that a more versatile hybrid junction would be welcomed as a highly desirable advancement of the art.

Accordingly, it is an object of this invention to provide a symmetrical seven port hybrid junction for use in microwave applications.

It is also an object of this invention to provide an improved microwave hybrid junction adaptable to the propagation of $TE_{10}$, $TE_{11}$ and TEM modes of wave energy.

It is further object of this invention to provide an improved hybrid junction for the variable distribution of wave energy in selected modes of propagation.

It is another object of this invention to provide an improved hybrid junction for lossless coupling between a coaxial transmission line and rectangular waveguide.

It is still another object of this invention to provide an improved hybrid junction for lossless coupling between rectangular waveguide and circular waveguide.

Other objects of the invention will become apparent upon a more comprehensive understanding of the invention for which reference is had to the following specification and drawings.

Wherein:

Fig. 4 is a tabulation showing power distribution in the various arms of the embodiment of Fig. 1 with incident power applied to the circular waveguide arm thereof for several matched conditions.

Fig. 5 is a tabulation showing power distribution in the various arms of the embodiment of Fig. 1 with incident power applied to the coaxial arm thereof for several matched conditions.

Fig. 6 is a tabulation of voltage outputs at the various ports of the device for the circular waveguide-coaxial transmission line matched condition.

Fig. 7 is a tabulation of voltage outputs at the various ports of the device for the rectangular waveguide-coaxial transmission line matched condition.

Fig. 8 is a tabulation of voltage outputs at the various ports of the device for the rectangular waveguide-circular waveguide matched condition.

Fig. 9 is a topside view of the device of this invention in an operational arrangement.

Figures 1, 2, 3:
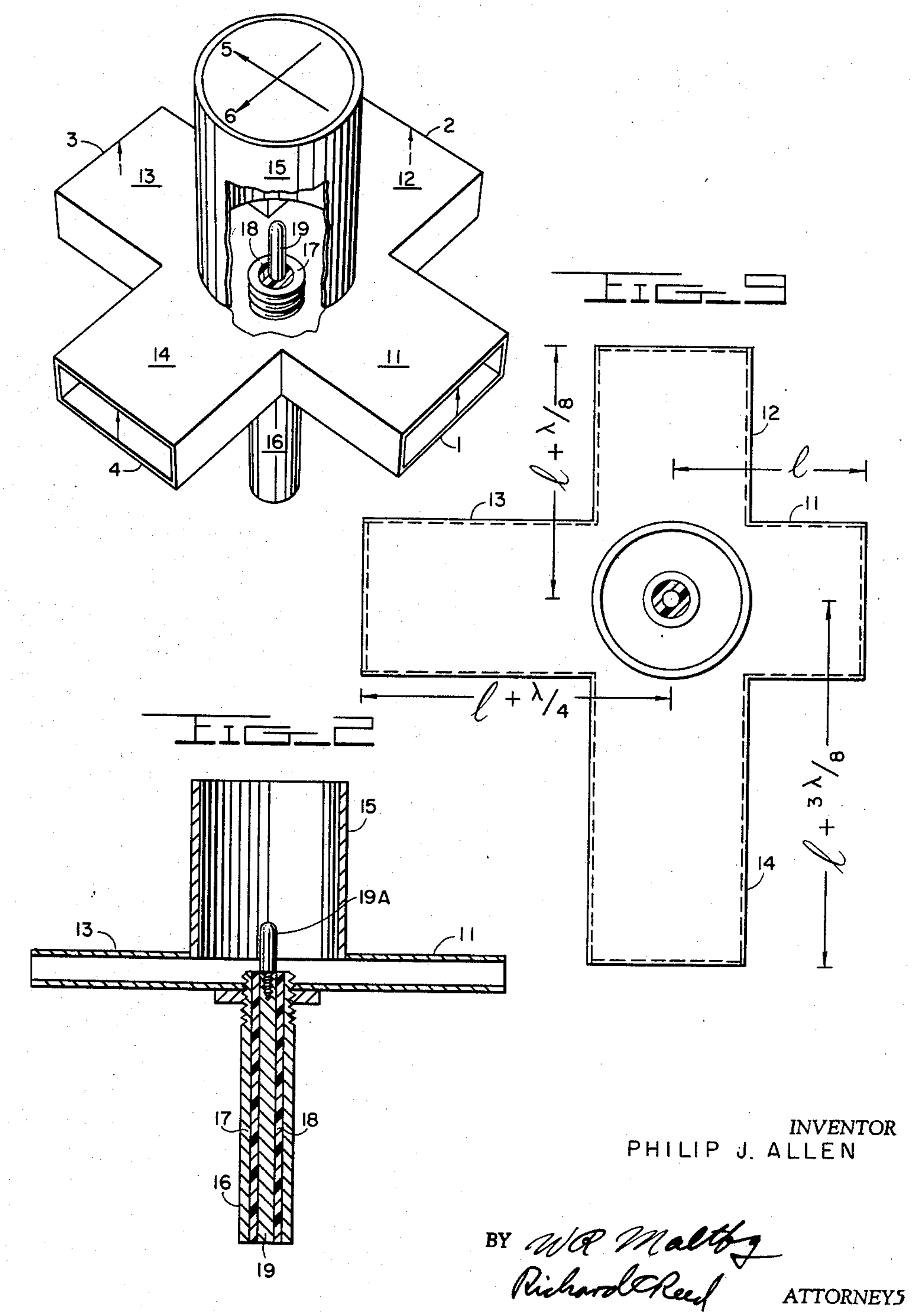
Fig. 1 is a pictorial and partially cutaway showing of one embodiment of the invention.
Fig. 2 is a cross-sectional showing of the matching structure of the embodiment of Fig. 1.
Fig. 3 is a tabulation showing power distribution in the various arms of the embodiment of Fig. 1 with incident power applied to a rectangular waveguide arm thereof for several matched conditions.

Briefly, the novel hybrid junction of this invention comprises four rectangular waveguide sections orthogonally disposed with their axes in a single plane plus a circular waveguide section and a coaxial transmission line each disposed in perpendicular relation to and on opposite sides of the plane of the rectangular waveguide axes such that the axis of the circular waveguide section and the central conductor of the coaxial transmission line meet in the vicinity of the intersection of axes of the rectangular waveguide. The device is adjustable for matching purposes. By proper adjustment, any two of the three types of transmission lines, rectangular waveguide, circular waveguide and coaxial line may be matched for lossless coupling between the $TE_{10}$ mode and either the $TE_{11}$ or the TEM mode of propagation. The device is adjustable also for proportional power distribution in the three types of transmission line.

A preferred embodiment of the device of this invention is shown in Fig. 1. In this embodiment, four sections of rectangular waveguide 11, 12, 13 and 14 are connected and symmetrically joined with the section of circular waveguide 15 such that the axes of the five waveguide sections meet in a common central point and are mutually perpendicular. A coaxial transmission line 16 comprising the outer conductor 17, dielectric 18 and center conductor 19 is disposed opposite the circular waveguide with the conductor 19 centered on the axis of the circular waveguide 15. In the embodiment, the rectangular waveguide 11, 12, 13 and 14 support the $TE_{10}$ dominant mode of wave energy propagation and provide the ports 1, 2, 3 and 4, respectively. The circular waveguide 15 supports two orthogonal dominant modes of the $TE_{11}$ variety and provides the ports 5 and 6. Likelike the coaxial transmission line 16 supports the TEM mode of wave energy propagation and provides the port 7. As is well known in the art, the dominant mode of a microwave transmission line is that mode which the transmission line will support at its lowest operating frequency.

Fig. 2 is a cross-sectional showing of the matching structure of the embodiment of Fig. 1 which is demonstrative of one means for varying the reflection coefficient of each branch. In this multi-pedestal type of matching structure there should be at least two independent nonlinearities, that is, at least two pedestal levels. As shown in the drawings, the extent of the insertion of the outer conductor 17, which determines one pedestal level, may be made variable by threading the outer conductor and the immediately adjacent shoulder of the hybrid junction wall. In addition, the extent of the insertion of the inner conductor 19, which determines another pedestal level, may be made variable by the used of a removable tip 19A which may be replaced by tips of different height. Typical pedestal levels for the matching structure shown in Figs. 1 and 2 are .594 inch for the centermost pedestal and .212 inch for the outermost pedestal. These exemplary pedestal levels are for a hybrid junction employing a circular waveguide having an inside diameter of .9375 inch, rectangular waveguide having inside dimensions .4 inch by .9 inch, and a coaxial line having an outside diameter of .4375 inch with a center conductor .125 inch in diameter. The pedestal levels given above are measured with respect to the plane formed by the bottom side of the rectangular waveguide sections and are for the circular waveguide-coaxial transmission line matched condition.

It also will be appreciated that matching may be achieved by varying the extent of the insertion of the dielectric 18. For example, the inner surface of the outer conductor 17 and the outer surface of the dielectric may be threaded, if desired. It is understood, of course, that a variable matching means is not essential to the invention. Thus the extent of the insertion of the coaxial line may be predetermined for a particular application and the coaxial line rigidly mounted in the hybrid junction in accordance therewith.

It also will be appreciated that other well known microwave matching aids might be employed to achieve a proper match in the device of this invention. For instance, a conventional thin ring, large hole, circular iris, not shown, might be disposed in the circular waveguide section 15 directly above the point of axes intersection, if desired.

In the novel hybrid junction of this invention, as exemplarily shown in Figs. 1 and 2, an input signal may be applied to any of the seven ports. In any instance, the resultant microwave properties of the junction are dependent upon the matching condition therein.

For purposes of simplification, impedance matching and the ensuing power transmission properties of the device for single modes of excitation are tabulated in Figs. 3, 4 and 5 of the drawings. In these tabulations and in the tabulations of Figs. 6, 7 and 8, as well, it has been assumed that ideal reflectionless terminations are connected to all arms of the device and that only the $TE_{10}$, $Te_{11}$ and TEM modes are propagated in the rectangular waveguide, circular waveguide and coaxial transmission line, respectively. The necessary conditions for matching the device are that the reflection coefficients of the two types of branches to be matched must be individually and simultaneously zero. In other words, the voltage standing wave ratio in each type of branch is equal to unity when the two types of branches are matched.

Fig. 3 shows the microwave properties of the device for unit power in the $TE_{10}$ mode incident upon a rectangular waveguide arm.

Fig. 4 shows the microwave properties of the embodiment shown in Fig. 1 for unit power in the $TE_{11}$ mode incident upon the circular waveguide arm. Considering the input signal to have a polarization appropriate for the port 5, the aligned rectangular arms referred to in the tabulation may be further identified as 11 and 13 and the orthogonal rectangular arms may be further identified as 12 and 14. This identification is peculiar to the embodiment of Fig. 1 in that it is not essential to the device of this invention that the ports 5 and 6 be aligned with the rectangular waveguide branches.

From Figs. 3 and 4, it will be seen that for the rectangular waveguide-circular waveguide matched condition, the microwave properties of the device of this invention are substantially the same as those of the turnstile junction described in the patent to R. H. Dicke No. 2,686,901 which issued August 17, 1954. For the rectangular waveguide-coaxial line matched condition and for the circular waveguide-coaxial line matched condition, however, it will be seen that the microwave properties of the device of this invention are entirely different.

For example, with the coaxial and circular arms matched, incident unit power to a rectangular arm is distributed among all the arms with one sixteenth to each of the four rectangular arms, one half to the circular arm and one fourth to the coaxial arm. And with the coaxial and rectangular arms matched, incident unit power to the circular arm is distributed among the arms as follows; three eights to each of the aligned rectangular arms, none to the coaxial arm, none to the orthogonally disposed rectangular arms and one fourth is reflected.

Fig. 5 shows the microwave properties of this device for unit power in the TEM mode incident upon the coaxial arm.

From Fig. 5 it will be seen that the coaxial line and the circular waveguide are completely isolated from each other in the three matched conditions. It will also be seen that in the rectangular and circular waveguide matched condition, all the incident power is reflected and none is coupled to the rectangular waveguide arms of the device, while in the other two matched conditions, power incident upon the coaxial arm is distributed equally among the four rectangular waveguide arms.

The device of this invention is not limited to single mode excitation, of course, and many interesting and useful results are obtained by the innumerable multiple mode excitation combinations which the invention affords.

As a sampling of the multimode excitation of the device of this invention, the amplitudes and relative phases of voltages coupled to each arm are determined for excitation of the junction by various combinations of $TE_{10}$ modes applied to the rectangular arms in the tabulations of Figs. 6, 7 and 8.

In the Figs. 6, 7 and 8 the inputs to the rectangular waveguide ports 1, 2, 3 and 4 are identified as $A_1$, $A_2$, $A_3$ and $A_4$, respectively. A minus sign (—) before the port identification is used to indicate a 180 degree phase reversal. In the output columns, phase angles are generally identified as $S_1$, $S_2$, $S_3$ or $S_5$ and similar phase angles are similarly identified. A 180 degree out-of-phase relationship between phase angles is indicated by a precedent minus sign (—). It will be noted that the tabulations of Figs. 6, 7 and 8 are reciprocal. That is, where a particular output is prescribed by a selected input, the reverse also holds and those output voltages when employed as an input will prescribe the selected input voltages as an output.

Fig. 6 shows microwave properties of the device in the circular waveguide-coaxial transmission line matched condition wherein the reflection coefficients of the branches 15 and 16 are individually and simultaneously zero. From Fig. 6, it will be seen that for this particular matching condition a complete cancellation of the output voltages occurs in the rectangular waveguide branches when the junction is excited, in a first instance, by in-phase and equal-amplitude $TE_{10}$ modes on a pair of adjacent rectangular waveguide branches, in a second instance, by in-phase and equal-amplitude $TE_{10}$ modes on all four rectangular waveguide branches, and in a third instance, by out-of-phase and equal-amplitude $TE_{10}$ modes on opposite rectangular waveguide branches.

Fig. 7 shows microwave properties of the device in the rectangular waveguide-coaxial transmission line matched condition wherein the reflection coefficients of the branches 11, 12, 13, 14 and 16 are individually and simultaneously zero. From Fig. 7, it will be seen that for this particular matching condition a complete cancellation of the output voltages occurs in the rectangular and circular waveguide branches and the sole output appears at the port 7, the coaxial branch 16, when the junction is excited by in-phase and equal-amplitude $TE_{10}$ modes on all four rectangular waveguide branches.

Fig. 8 shows microwave properties of the device in the rectangular waveguide-circular waveguide matched condition wherein the reflection coefficients of the branches 11, 12, 13, 14 and 15 are individually and simultaneously zero. From Fig. 8 it will be seen that for this particular matching condition, the port 7 is completely isolated, that is, no output occurs at the coaxial branch 16 irrespective of the input signals applied.

Since the microwave properties shown in the tabulation of Fig. 8 are substantially the same as the microwave properties of the conventional turnstile junction, the tabulations of Figs. 6 and 7 may be compared therewith in recognition of some of the unique properties of the trimode hybrid junction of the present invention.

With reflectionless terminations on all branches, the device of this invention does not permit coupling between the coaxial transmission line branch 16 and the circular waveguide branch 15 in any of the three matched conditions. This isolation is due primarily to the geometrical symmetry of the junction. It will be appreciated, however, that this isolation condition is generally peculiar to the assemblage in which all branches have a reflectionless termination.

Fig. 9 depicts the device of this invention in an operational embodiment for coupling between the coaxial transmission line branch 16 and the circular waveguide branch 15 in which the rectangular waveguide branches 11, 12, 13 and 14 are each terminated by shorting means, rather than reflectionless terminations means, and the junction is in the circular waveguide-coaxial transmission line matched condition. The function of this embodiment is the production of a circularly polarized output from a TEM mode input. In accordance therewith, the shorting means in the rectangular waveguide branches are strategically disposed relative to one another. For example, with the shorting means in branch 11 disposed at a distance $l$ from the common central point of the junction, the shorting means in the branches 12, 13 and 14 are disposed at the distances, $l+\lambda/8$, $l+\lambda/4$, and $l+3\lambda/8$ from the common central point of the junction, respectively, where $\lambda$ is the wavelength at the operating frequency of the system. In this arrangement, the TEM input to branch 16 will divide equally among the branches 11, 12, 13 and 14, and will then be reflected back to exit via the branch 15 in proper phase to produce a circularly polarized output of selected sense of rotation. It will be appreciated that the sense of rotation may be reversed by switching the respective locations of the shorting means in the branches 12 and 14.

Another utility of the device is as a power divider. For example, as shown in the tabulation of Fig. 5, a power input to the coaxial branch will divide equally among the rectangular waveguide branches in the circular waveguide-coaxial transmission line and the rectangular waveguide-coaxial transmission line matched conditions. It will be appreciated, of course, that it is not essential to all the power divider applications of this device that a matched condition exists. Indeed, the power distribution in most applications may be varied to some extent by adjustment of the matching means, if desired.

It is readily apparent that the device of this invention may be advantageously employed in a wide variety of microwave applications. Therefore, it is understood that the device of this invention is not restricted to the several applications exemplarily described herein.

It is also understood that it is not essential to the basic concept of the invention that four similar waveguide branches be employed to establish the previously referred to axes plane in this invention and that a greater or lesser number might be employed without disturbing the basic symmetry of the junction, if desired. Finally it is understood that this invention is to be limited only by the scope of the claims appended hereto.

Wht is claimed is:

1. A hybrid junction for coupling between different modes of propagation in a microwave system comprising a plurality of similar waveguide branches equidisposed with respect to each other about a common central point with their axes in coplanar relation, each branch in said plurality being of a type which is capable of supporting a single dominant mode of a propagated wave, an additional waveguide branch of a type which is capable of supporting two orthogonal dominant modes of a propagated wave, said additional branch being disposed on a first side of the plane defined by the axes of said plurality of branches such that the axis of said additional branch is in perpendicular relation to said plane and meets said plane at said common central point, a coaxial branch of a type which is capable of supporting the TEM mode of a propagated wave, said coaxial branch being disposed on the side opposite said first side of said plane such that the centermost conductor of said coaxial branch is aligned with the axis of said additional branch, plus means for providing a substantially zero reflection coefficient at any two different types of branches simultaneously.

2. A hybrid junction for coupling between different modes of propagation in a microwave system comprising a group of four similar waveguide branches equidisposed with respect to each other about a common central point with their axes in coplanar relation, each branch in said group being of a type which is capable of supporting a single dominant mode of a propagated wave, an additional waveguide branch of a type which is capable of supporting two orthogonal dominant modes of a propagated wave, said additional branch being disposed on a first side of the plane defined by the axes of said group of branches such that the axis of said additional branch is in perpendicular relation to said plane and meets said plane at said common central point, a coaxial branch of a type which is capable of supporting the TEM mode of a propagated wave, said coaxial branch being disposed on the side opposite said first side of said plane such that the centermost conductor of said coaxial branch is aligned with the axis of said additional branch, plus means for providing a substantially zero reflection coefficient at any two different types of branches simultaneously.

3. A hybrid junction for coupling between different modes of propagation in a microwave system comprising a plurality of similar rectangular waveguide branches equidisposed with respect to each other about a common central point with their axes in coplanar relation, a circular waveguide branch disposed on a first side of the plane defined by the axes of said plurality of branches such that the axis of said circular waveguide branch is in perpendicular relation to said plane and meets said plane at said common central point, a coaxial branch disposed on the side opposite said first side of said plane such that the centermost conductor of said coaxial branch is aligned with the axis of said circular waveguide branch, plus means disposed in the vicinity of said common central point for providing a substantially zero reflection coefficient at several of said branches simultaneously.

4. A hybrid junction for coupling between different modes of propagation in a microwave system comprising a group of four similar rectangular waveguide branches equidisposed with respect to each other about a common central point with their axes in coplanar relation, a circular waveguide branch disposed on a first side of the plane defined by the axes of said group of branches such that the axis of said circular waveguide branch is in perpendicular relation to said plane and meets said plane at said common central point, a coaxial branch disposed on the side opposite said first side of said plane such that the centermost conductor of said coaxial branch is aligned with the axis of said circular waveguide branch, plus means disposed in the vicinity of said common central point for providing a substantially zero reflection coefficient at several of said branches simultaneously.

5. A hybrid junction for coupling between different modes of propagation in a microwave system comprising a plurality of similar rectangular waveguide branches equidisposed with respect to each other about a common central point with their axes in coplanar relation, a circular waveguide branch disposed on a first side of the plane defined by the axes of said plurality of branches such that the axis of said circular waveguide branch is in perpendicular relation to said plane and meets said plane at said common central point, a coaxial branch disposed on the side opposite said first side of said plane such that the centermost conductor of said coaxial branch is aligned with the axis of said circular waveguide branch, plus pedestal means for providing a substantially zero reflection coefficient at several of said branches simultaneously, said pedestal means comprising a plurality of concentric pedestals, having differing heights, disposed in the vicinity of said common central point such that the centermost pedestal is aligned with the axis of said circular waveguide branch, means for electrically insulating said centermost pedestal from the outermost pedestal of said plurality of pedestals.

6. A hybrid junction for coupling between different modes of propagation in a microwave system comprising a group of four similar rectangular waveguide branches equidisposed with respect to each other about a common central point with their axes in coplanar relation, a circular waveguide branch disposed on a first side of the plane defined by the axes of said group of branches such that the axis of said circular waveguide branch is in perpendicular relation to said plane and meets said plane at said common central point, a coaxial branch disposed on the side opposite said first side of said plane such that the centermost conductor of said coaxial branch is aligned with the axis of said circular waveguide branch, plus pedestal means for providing a substantially zero reflection coefficient at several of said branches simultaneously, said pedestal means comprising a plurality of concentric pedestals, having differing heights, disposed in the vicinity of said common central point such that the centermost pedestal is aligned with the axis of said circular waveguide, means for electrically insulating said centermost pedestal from the outermost pedestal of said plurality of pedestals.

7. A hybrid junction for coupling between different modes of propagation in a microwave system comprising a plurality of similar rectangular waveguide branches equidisposed with respect to each other about a common central point with their axes in coplanar relation, a circular waveguide branch disposed on a first side of the plane defined by the axes of said plurality of branches such that the axis of said circular waveguide branch is in perpendicular relation to said plane and meets said plane at said common central point, a coaxial branch disposed on the side opposite said first side of said plane such that the centermost conductor of said coaxial branch is aligned with the axis of said circular wave guide branch, pedestal means for providing a substantially zero reflection coefficient at several of said branches simultaneously, said pedestal means comprising a pluralty of concentric pedestals, having differing heights, disposed in the vicinity of said common central point such that the centermost pedestal is aligned with the axis of said circular waveguide, means for electrically insulating said centermost pedestal from the outermost pedestal of said plurality of pedestals, and means for varying the height of pedestals in said plurality of pedestals.

8. A hybrid junction for coupling between different modes of propagation in a microwave system comprising a group of four similar rectangular waveguide branches equidisposed with respect to each other about a common central point with their axes in coplanar relation, a circular waveguide branch disposed on a first side of the plane defined by the axes of said group of branches such that the axis of said circular waveguide branch is in perpendicular relation to said plane and meets said plane at said common central point, a coaxial branch disposed on the side opposite said first side of said plane such that the centermost conductor of said coaxial branch is aligned with the axis of said circular waveguide branch, pedestal means for providing a substantially zero reflection coefficient at several of said branches simultaneously, said pedestal means comprising a plurality of concentric pedestals, having differing heights, disposed in the vicinity of said common central point such that the centermost pedestal is aligned with the axis of said circular waveguide, means for electrically insulating said centermost pedestal from the outermost pedestal of said plurality of pedestals, and means for varying the height of pedestals in said plurality of pedestals.

9. A device for producing a circularly polarized wave from a TEM mode input wave in a microwave system comprising a plurality of at least three similar rectangular waveguide branches equidisposed with respect to each other about a common central point with their axes in coplanar relation, an output circular waveguide branch disposed on a first side of the plane defined by the axes of said plurality of branches such that the axis of said circular waveguide branch is in perpendicular relation to said plane and meets said plane at said common central point, an input coaxial branch disposed on the side opposite said first side of said plane such that the centermost conductor of said coaxial branch is aligned with the axis of said circular waveguide branch, impedance matching means disposed in the vicinity of said common central point for providing a substantially zero reflection coefficient at said circular waveguide and said coaxial branches simultaneously, plus means for reflecting back a propagated wave disposed in each of said rectangular waveguide branches, each of said reflecting means being disposed at a greater distance from said common central point than the distance from said common central point of the reflecting means in one adjacent rectangular waveguide branch, the difference of said distances in each instance being the wavelength at the operating frequency of the microwave system divided by twice the number of rectangular waveguide branches in said plurality.

10. A device for producing a circularly polarized wave from a TEM mode input wave in a microwave system comprising a group of four similar rectangular waveguide branches equidisposed with respect to each other about a common central point with their axes in coplanar relation, an output circular waveguide branch disposed on a first side of the plane defined by the axes of said group of branches such that the axis of said circular waveguide branch is in perpendicular relation to said plane and meets said plane at said common central point, an input coaxial branch disposed on the side opposite said first side of said plane such that the centermost conductor of said coaxial branch is aligned with the axis of said circular waveguide branch, means disposed in the vicinity of said common central point for providing a substantially zero reflection coefficient at said circular waveguide and said coaxial branches simultaneously, plus means for reflecting back a propagated wave disposed in each of said rectangular waveguide branches, each of said reflecting means being disposed at a greater distance from said common central point than the distance from said common central point of the reflecting means in one adjacent rectangular waveguide branch, the approximate difference of said distances in each distance being the wavelength at the operating frequency of the microwave system divided by eight.

References Cited in the file of this patent

UNITED STATES PATENTS

| | | |
|---|---|---|
| 2,433,011 | Zaleski | Dec. 23, 1947 |
| 2,445,896 | Tyrrell | July 27, 1948 |
| 2,686,901 | Dicke | Aug. 17, 1954 |
| 2,714,707 | Zabel | Aug. 2, 1955 |